May 3, 1932. H. V. SHIRLEY ET AL 1,856,140
SPOOLING DEVICE
Filed Oct. 6, 1927 2 Sheets-Sheet 1

INVENTORS,
Herman V. Shirley and
Henry P. Scanlon;
BY
Blakeslee & Brown,
ATTORNEYS.

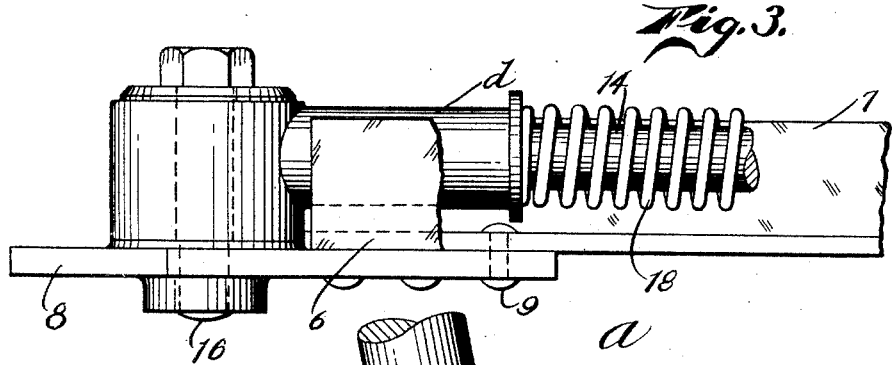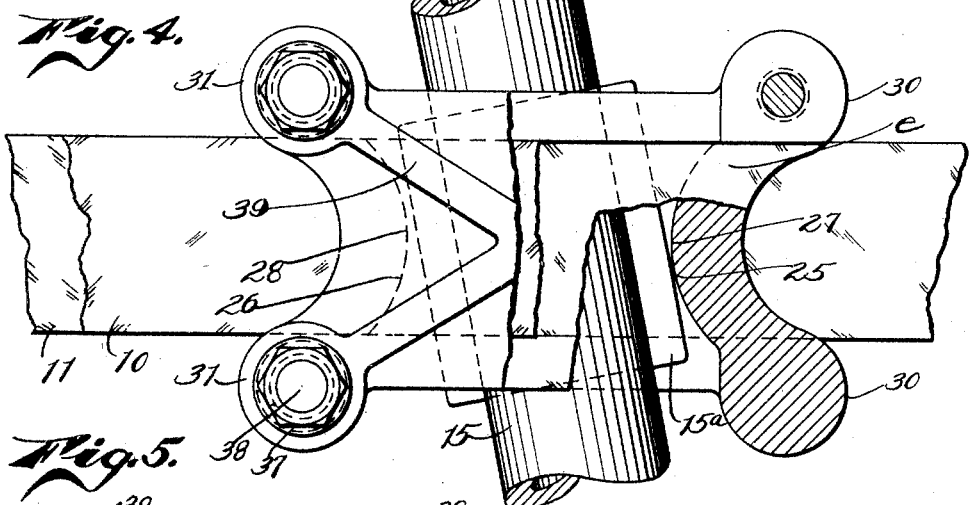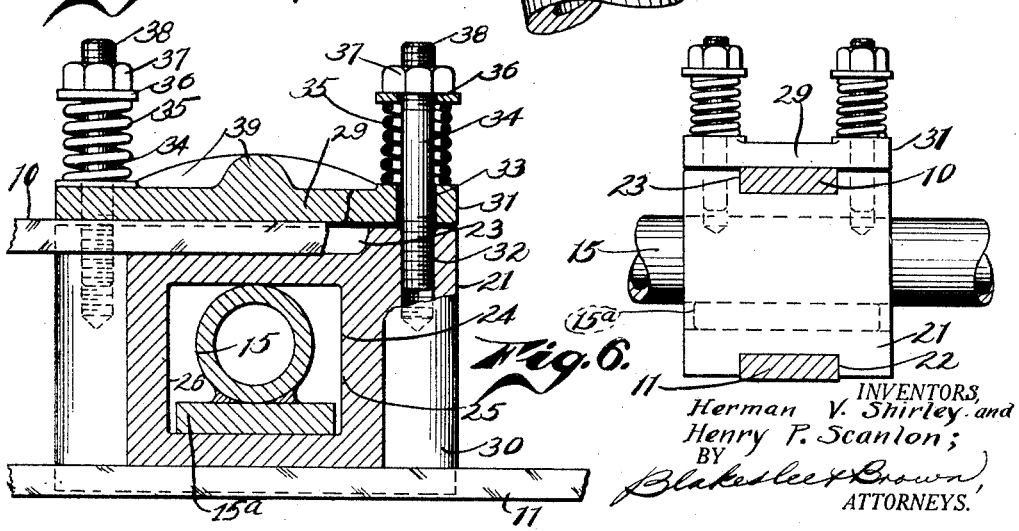

Patented May 3, 1932

1,856,140

UNITED STATES PATENT OFFICE

HERMAN V. SHIRLEY AND HENRY P. SCANLON, OF LONG BEACH, CALIFORNIA

SPOOLING DEVICE

Application filed October 6, 1927. Serial No. 224,306.

This invention relates to spooling devices and is an improvement upon our co-pending application for line spoolers, filed in the Patent Office September 22, 1924, Serial No. 739,136.

The invention has for an object the provision of a novel spooling device adapted to accurately spool a line upon a drum and in such a manner that the different convolutions of the line are accurately and closely and tightly placed upon said drum so that the line is not abraded by improper spooling. One of the chief difficulties in the spooling of lines, particularly when the line is not properly spooled, resides in the fact that when weight is imposed upon the line the improper convolutions of the line on the drum will cut into other convolutions and rapidly ruin the line.

The invention has for an object the provision of a spooling device which is simple of structure, inexpensive of manufacture and generally superior to line spoolers now in use.

With the above and other objects in view, the invention consists in the novel and useful provision, formation, construction, association and relative arrangement of parts, members and features, all as shown in certain of its embodiments in the accompanying drawings, described generally and more particularly pointed out in claims.

In the drawings:

Figure 3 is a fragmentary enlarged view and side elevation of a portion of the spooling device;

Figure 4 is a fragmentary top plan view on an enlarged scale from the showing in the remaining figures of a part of the spooling device;

Figure 5 is a fragmentary and partially sectional elevation of a portion of the spooling device; and, Figure 6 is a side elevation of the part shown in Figure 5 and on a reduced scale from the showing of Figure 5.

Corresponding parts in all the figures are designated by the same reference characters.

Figure 1:
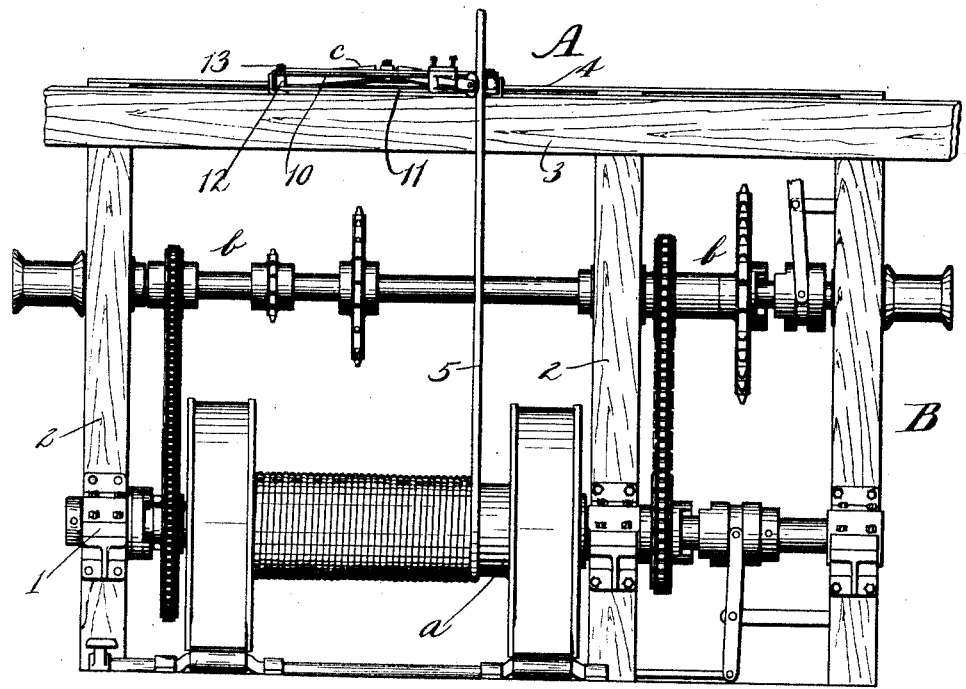
Figure 1 is an elevation of a rotary draw-works with the spooling device associated with the framing for such draw-works.
Figure 2:
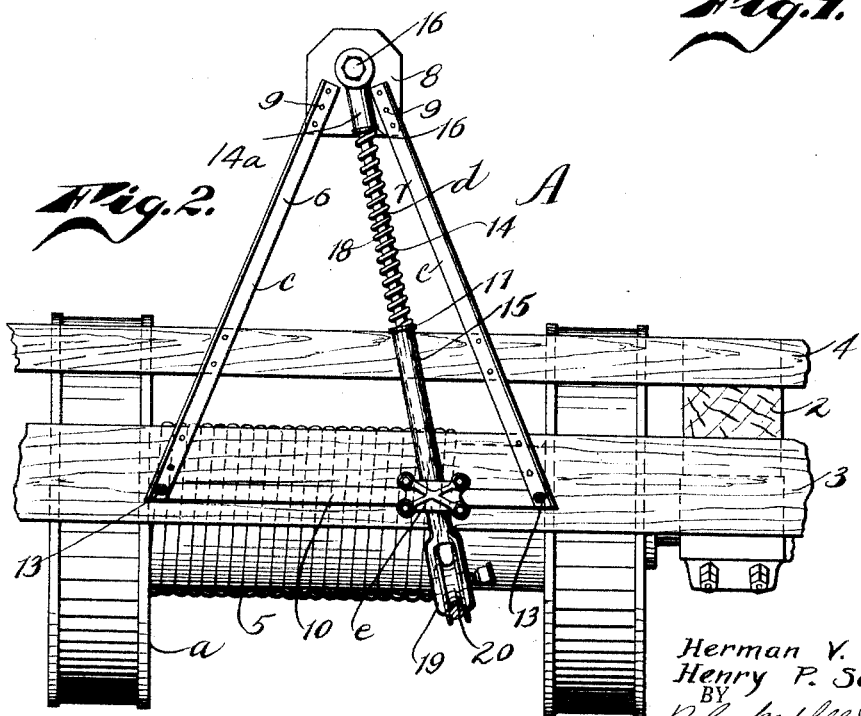
Figure 2 is a top plan view of the draw-works and spooling device shown in Figure 1.

Referring with particularity to the drawings, the improved spooling device or line spooler is designated as an entirety and in one embodiment by A and which line spooler is adapted in the present instance to be associated with rotary draw-works B. The said draw-works B is conventional in form, comprising a drum $a$ carried on a shaft, which in turn is carried in suitable bearings 1 secured to frame uprights 2, there being suitable mechanism designated generally as $b$ for turning the drum $a$. The usual girts 3 and 4 are associated with the uprights 2 and the drum $a$ is adapted to have wound thereon a line 5 such as a wire line which is used for lifting casing, tubing and the like. It is usual to provide a derrick of some form over a well hole and the line 5 would be passed over suitable sheaves in the crown of a derrick with one end of such line carrying an elevator of some form so that tubing or casing might be engaged and either be lifted from the well hole or held in such a position as to be screw-threaded to other tubing or casing to be lowered within the well hole. The present invention, as has been previously stated, is adapted to accurately spool the line 5 upon the drum $a$. The line spooler A includes a frame member designated generally as $c$ and which frame member may comprise two arms 6 and 7 joined to a plate 8 by suitable means 9 and in such a manner as to maintain the arms convergently outwardly from the zone of attachment with said plate 8 with a pair of spaced bars 10 and 11 secured at ends of said arms 6 and 7. The arms 6 and 7 in the present instance are of angle iron formation and the said bars 10 and 11 are suitably spaced apart by separators 12 secured between the bars with the bars and separators secured by suitable means 13 to one of the legs of each of the arms. A spooling arm $d$ comprising two telescoping members 14 and 15 has the member 14 pivoted to the plate 8 by suitable means 16. The arm 14 is enlarged as shown at $14^a$ and interposed as between the enlarged portion 14ª of such arm and an end 17 of the arm 15 and likewise surrounding the arm 14 is a coil spring 18. The normal tendency of the spring is to urge outward longitudinal movement of the arm 15 on the arm 14. The arm 14 is provided with a clevis 19 within which is journaled a sheave 20.

Adapted to be interposed between the bars 10 and 11 is a member e, which member e includes a block 21 provided with a pair of spaced slots 22 and 23 adapted to receive and confine in part bars 10 and 11. Said block is provided with a central bore or opening 24 which in the present instance is square in cross section, said opening through the block being at right angles to the slotted portions 22 and 23 of said block, and the arm 15 is passed through said opening 24, as shown in Figs. 4 to 6 inclusive. The walls 25 and 26 bounding said opening 24 are curved as shown in Figure 4 at 27 and 28. The arm 15 carries a plate 15ª normally confined within said opening 24. Adapted to be yieldingly secured to the block 21 is a plate 29 likewise forming a part of the member e and which plate is adapted to engage the top surface of the bar 10, as shown best in Figure 6. The said block 21 is formed with four curved corner portions designated generally as 30, and the said member 29 is correspondingly formed as shown at 31, and the curved corner portions of the block are provided with screw-threaded bores as illustrated at 32, and the curved corner portions of the member 29 are likewise bored as shown at 33, there being screw-threaded studs 34 secured to the screw-threaded portions 32 of the block and passed through the bores 33 of the member 29. Adapted to surround the studs 34 are coil springs 35 which bear against the top surface of the member 29, and against washers 36 which are secured in adjusted positions relative to the stud or studs by nuts 37 carried on screw-threaded ends 38 of the studs. Thus the frictional engagement that exists between the top and bottom surfaces of the bar 10 with the block 21 and member 29 can be directly regulated by adjusting the nuts 37 to adjust the spring pressure. The member 29 is provided with ribs 39 for strengthening the said member 29. If desired, a plate similar to that shown at 29 may be provided for the bottom of the block for engagement with the bar 11. The member e may be termed the friction guide head or block in that said member e is itself guided as to movement by the bars 10 and 11 which function as guide bars and likewise acts to guide the swinging movement of the arm d while the line 5 is being spooled on the drum a. The plate 15ª swings along the curved surfaces 27 or 28 in the block during the swinging movement of the arm d and the spacing between adjacent convolutions of the line 5 on the drum a is directly regulated by regulating the degree of frictional engagement of the guide head with the bars 10 and 11. The spring 18 normally tends to cause outward telescopic movement of the arm 15 on the arm 14, and suitable means, not shown, may be provided for limiting such outward movement. The purpose of allowing relative telescoping movement of the arms is in order to effectively compensate for change of radius during a swinging movement of the spooling arm d while a line is being spooled upon the drum a.

The operation of the device is as follows:

If we assume that it is desired to spool a line 5 upon the drum a, the line 5 will be under tension as the opposite end of said line may be carrying an elevator, which elevator secures tubing or the like weighing many hundreds of pounds. The mechanism b is set in operation and the drum a commences to rotate, whereupon the line will form convolutions upon the drum a being guided as to the spacing of said convolutions by the spooling device A. The tightness of adjacent convolutions of the line may be readily determined by adjusting the nuts 37 of the member e, as this adjustment will regulate the frictional engagement of the members 21 and 29 with the bar 10. This frictional engagement upon the bar 10 is of course of a resilient nature. Thus the said guide head may be caused to move at adjusted speeds. However, the friction must not be so great as to completely retard movement of the guide head, as this might cause the line to jump coils. It has been found by experiment that a regulating of the speed of movement of the arm d adjacent the sheave 20 is superior to regulating the speed of movement of the arm at a considerable distance from said sheave, as for instance, at the pivot point 16.

It is obvious that various changes and modifications and variations may be made in practicing the invention, in departure from the particular showing of the drawings, without departing from the true spirit of the invention.

Having thus disclosed our invention, we claim and desire to secure by Letters Patent:

1. In a line spooler, a swingingly mounted arm, means on said arm for guiding movement of a line to be spooled, and means associated with the arm and adjacent the first named means for retarding the swinging movement of the arm during a spooling of the line; said second means including a guide head formed with a bore through which the arm is passed; the side walls bounding the bore being curved, said arm being formed with a part for engagement with a curved side wall.

2. In a line spooler; a frame member including a pair of spaced guide bars; an arm pivoted to said frame member, a guide head between the guide bars, said arm member being passed through said guide head, and means carried by the guide head for frictionally engaging one of said guide bars.

3. In a line spooler, a frame member including a pair of spaced guide bars; an arm pivoted to said frame member, a guide head between the guide bars, said arm member being passed through said guide head, and means carried by the guide head for frictionally engaging one of said guide bars; said means including a plate in resilient engagement with said guide bar.

4. In a line spooler, a frame member including a pair of spaced guide bars; an arm pivoted to said frame member, a guide head between the guide bars, said arm member being passed through said guide head, and means carried by the guide head for frictionally engaging one of said guide bars; said guide head being slotted to receive said guide bars.

In testimony whereof, we have signed our names to this specification.

HERMAN V. SHIRLEY.
HENRY P. SCANLON.